US 6,450,637 B1

United States Patent
Zelman

(10) Patent No.: US 6,450,637 B1
(45) Date of Patent: Sep. 17, 2002

(54) AUXILIARY EYEWEAR ATTACHMENT METHODS AND APPARATUS AND UNIVERSAL ADAPTER

(76) Inventor: Gary Martin Zelman, 997 Flower Glen St., Simi Valley, CA (US) 93065

(*) Notice: Subject to any disclaimer, the term of this patent is extended or adjusted under 35 U.S.C. 154(b) by 0 days.

(21) Appl. No.: 09/694,091

(22) Filed: Oct. 20, 2000

Related U.S. Application Data

(63) Continuation-in-part of application No. 09/483,552, filed on Jan. 14, 2000, now Pat. No. 6,343,858, which is a continuation-in-part of application No. 09/184,694, filed on Nov. 2, 1998.

(51) Int. Cl.[7] .................................................. G02C 9/00
(52) U.S. Cl. .......................................... 351/47; 351/57
(58) Field of Search ...................................... 351/47, 57

(56) References Cited

U.S. PATENT DOCUMENTS 6,170,949 B1 * 1/2001 Mauch ........................ 351/47

FOREIGN PATENT DOCUMENTS

JP 9-101489 * 4/1997 ................... 351/47

* cited by examiner

Primary Examiner—Huy Mai
(74) Attorney, Agent, or Firm—David O'Reilly

(57) ABSTRACT

A method and apparatus for mounting auxiliary eyeglasses on conventional eyeglasses in which magnets are attached to appendages on the auxiliary eyeglasses mating with magnets mounted on the temple extensions of conventional eyeglasses. The magnets on the auxiliary eyeglasses are mounted in sockets formed on the appendages of the auxiliary eyeglasses such that their maximum magnetic force is oriented vertically or parallel to the plane of the conventional eyeglass frame. The appendages on the auxiliary eyeglass frame fit beneath the temple extensions on the conventional eyeglasses frame to hold the auxiliary frames in place solely by the magnetic attractive force. The orientation of the magnets is such that the maximum magnetic force resists any downward movement of the auxiliary eyeglasses on the conventional eyeglasses when installed. In a modification of the embodiment, the magnets mounted on the conventional eyeglasses are recessed in sockets formed on the temple extensions while the magnets mounted on the appendages extend out of the sockets. The extended magnets fit into the recesses in the conventional eyeglass sockets automatically aligning and securing the auxiliary eyeglasses on the conventional eyeglasses. Another embodiment is comprised of a universal adapter in which a magnet is mounted in a cylindrical socket and has a tongue with a hole for mounting on conventional eyeglasses with existing hardware.

8 Claims, 8 Drawing Sheets

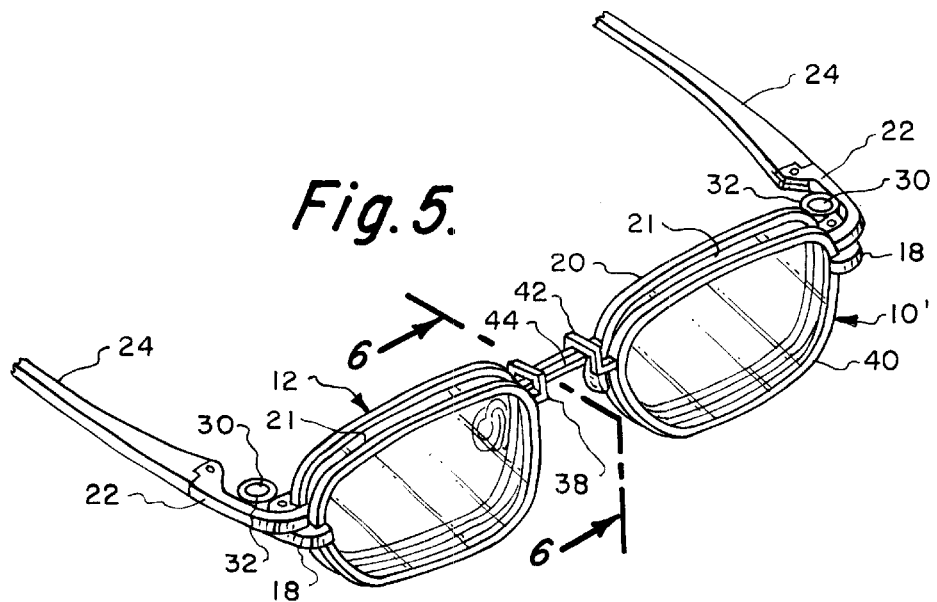
Fig. 5.
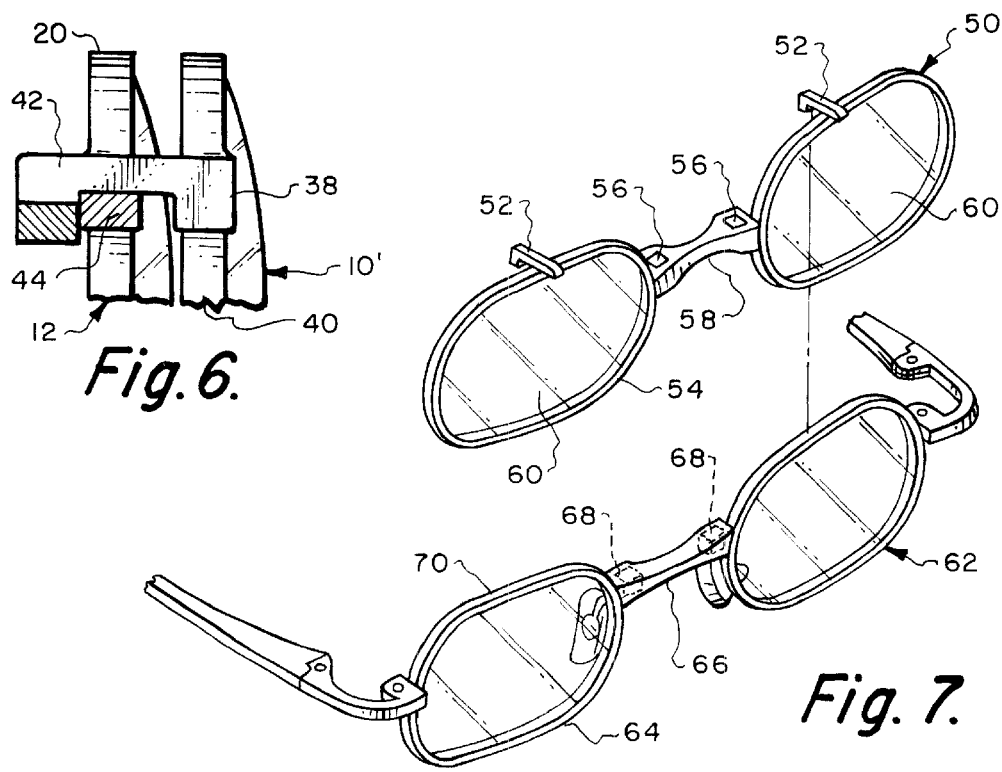
Fig. 6.
Fig. 7.

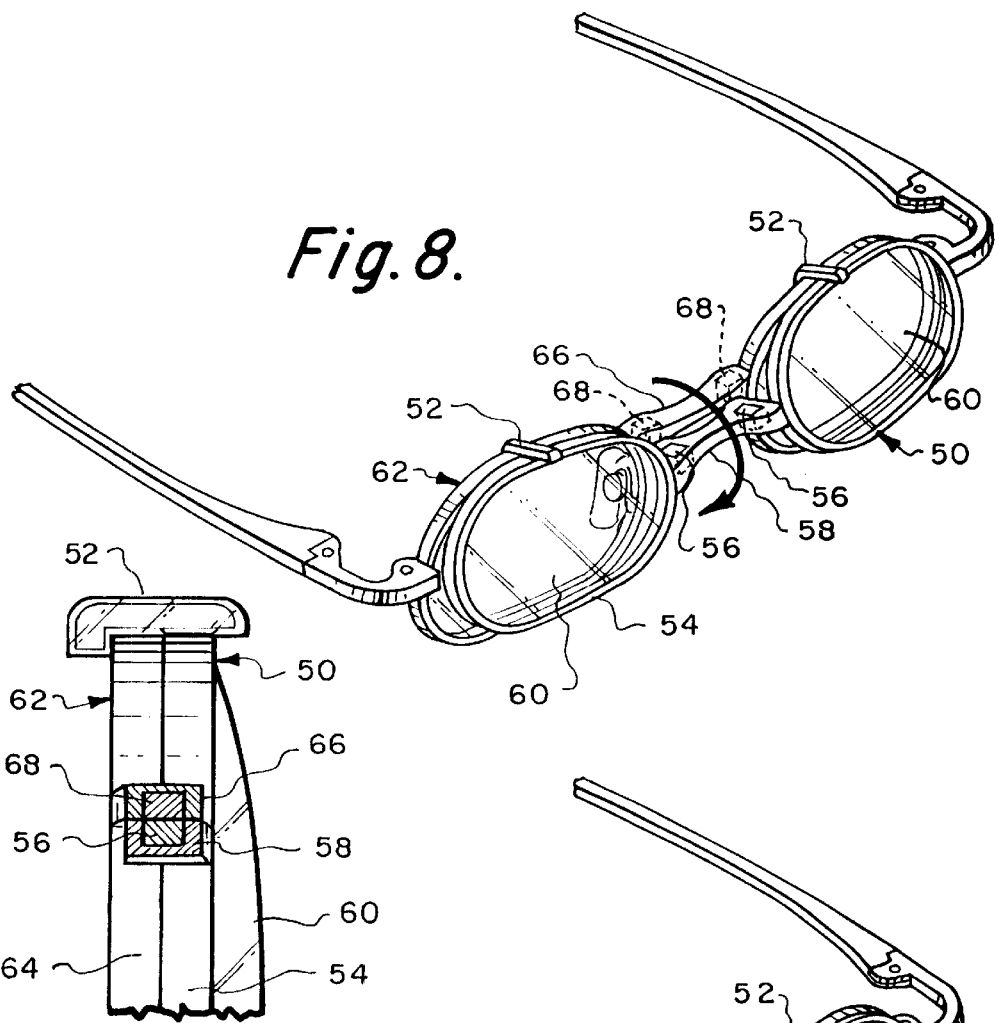
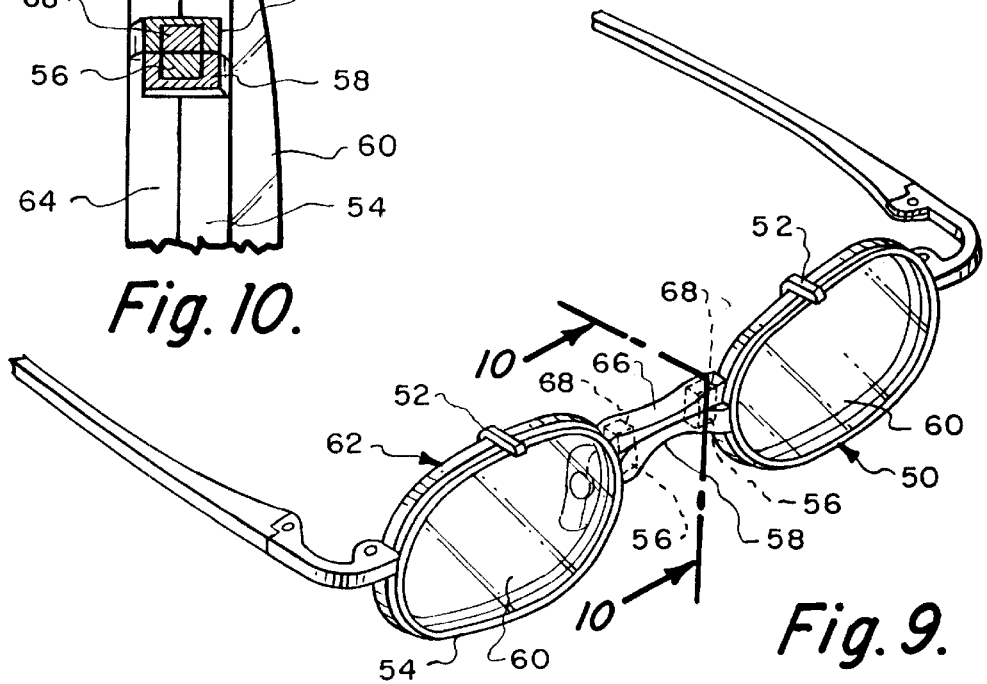
Fig. 8.
Fig. 10.
Fig. 9.

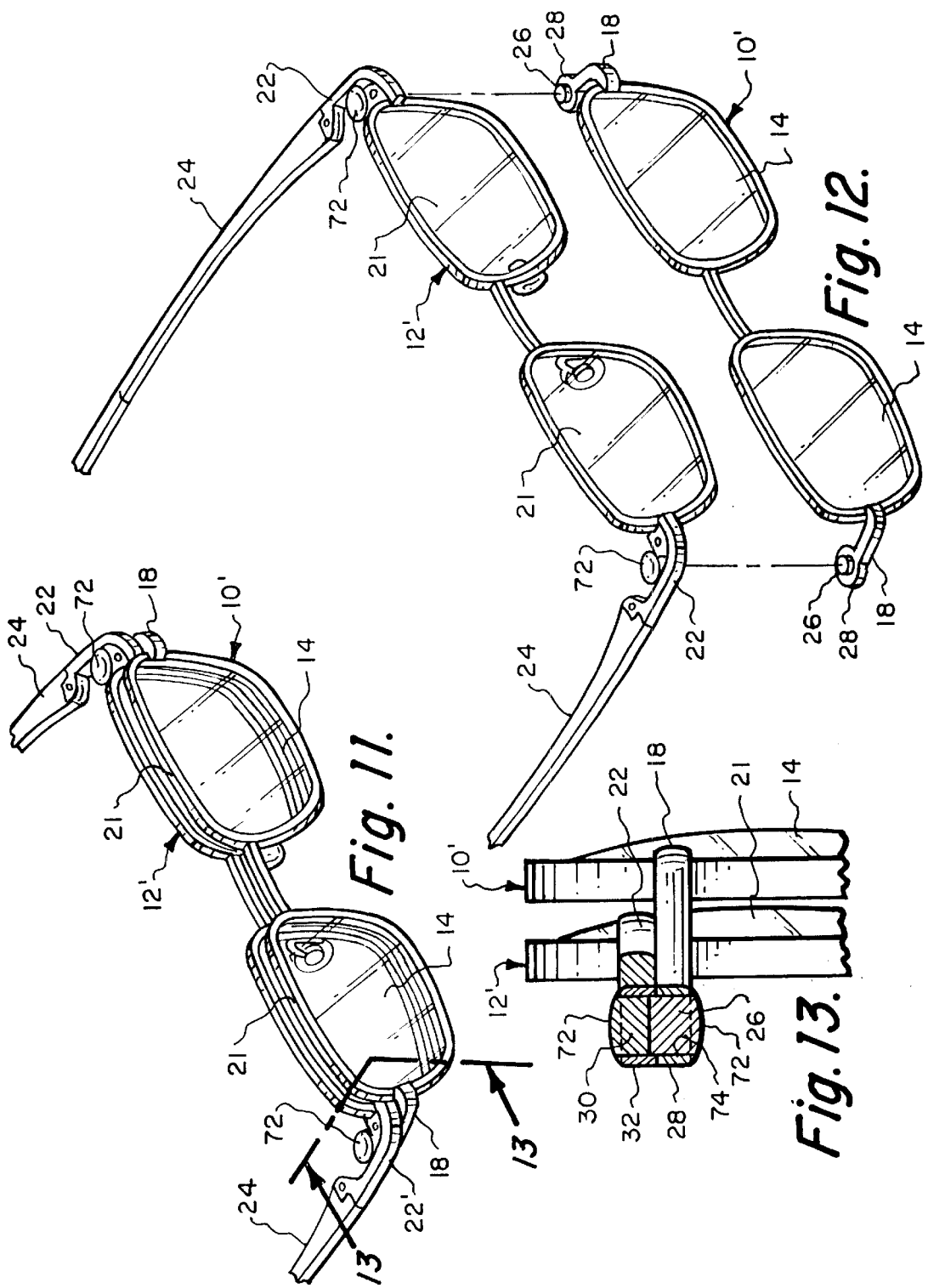

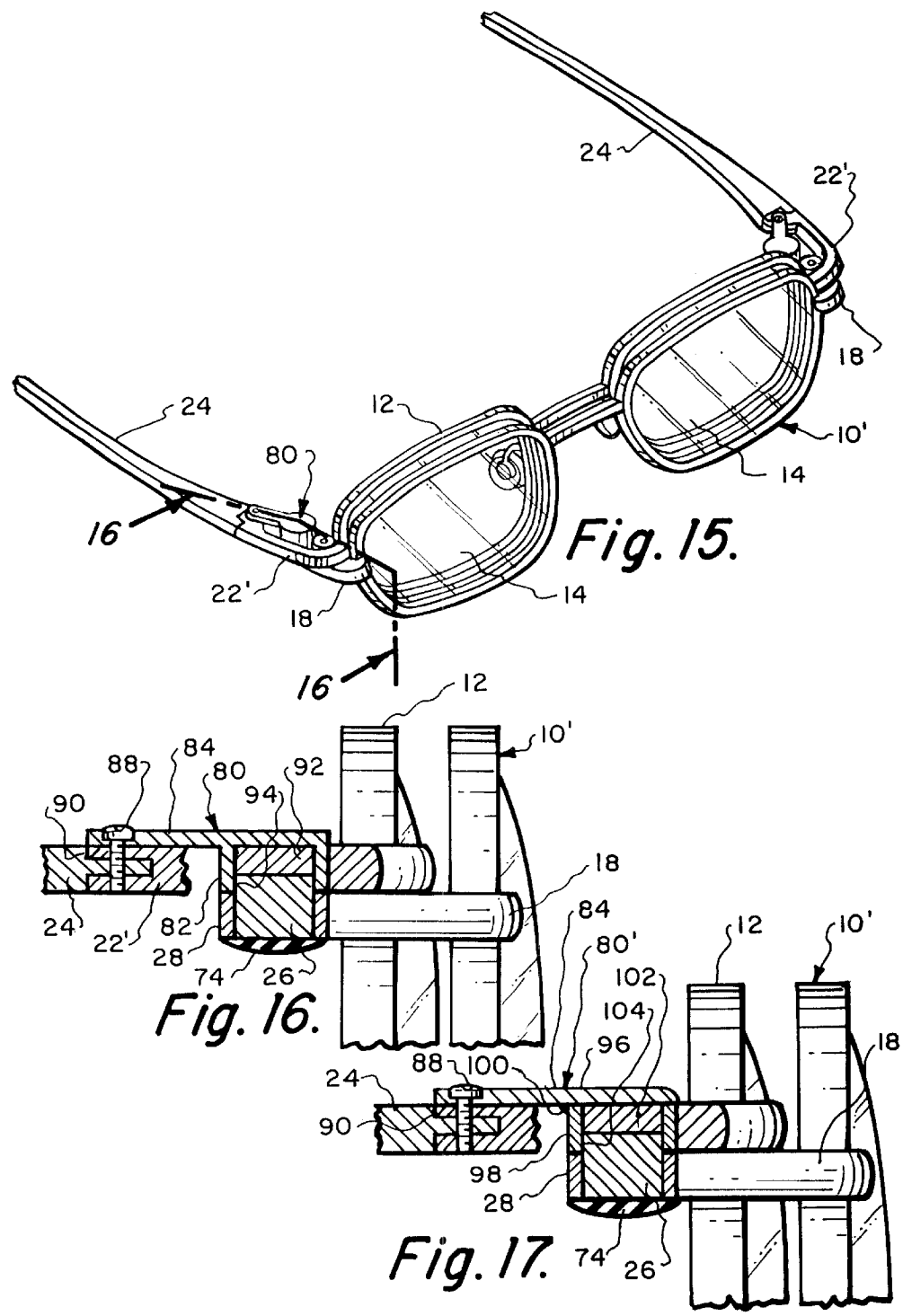

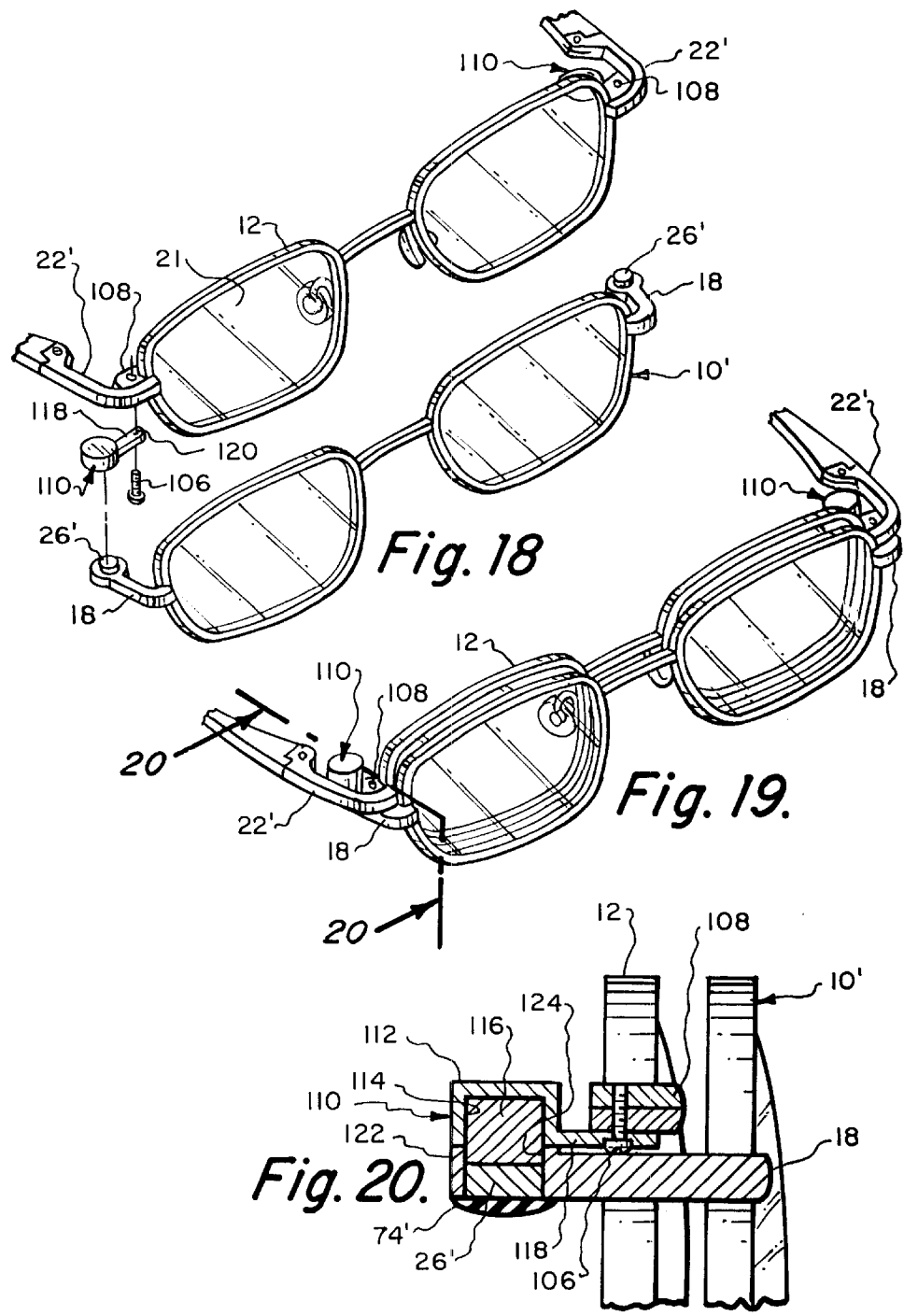

AUXILIARY EYEWEAR ATTACHMENT METHODS AND APPARATUS AND UNIVERSAL ADAPTER

This application is a Continuation-In-Part of patent application Ser. No. 09/483,552 filed Jan. 14, 2000 now U.S. Pat. No. 6,343,858 issued Feb. 5, 2002 and Prior application Ser. No. 09/184,694, filed Nov. 2, 1998.

BACKGROUND OF THE INVENTION

1. Field of the Invention

This invention relates to auxiliary eyewear attachment methods and apparatus, such as clip-on eyewear, and more particular relates to an auxiliary eye wear for attaching auxiliary sunglasses to conventional eyeglasses.

2. Background Information

Auxiliary eyewear to convert conventional eyeglasses to sunglasses are very popular. They allow the user to usually avoid the need for two separate prescription lenses. They can also be used, but less frequently, to attach auxiliary eyewear that can change the prescription of lenses. The more common use, however, is to add tinted lenses to conventional eyeglasses.

A number of different designs are available for auxiliary eyewear including clip-on eyewear, as well as auxiliary eyewear attachment using magnets. One method of attaching auxiliary eyewear is by clips. A method of attaching auxiliary eyewear by clips is shown and described in U.S. application Ser. No. 08/510,797 filed Aug. 3, 1995 to the same inventor as the invention disclosed herein and incorporated herein by reference. Another patent describing a clip-on type of sunglasses is disclosed and described in U.S. Pat. No. 5,696,571 issued Dec. 9, 1997 to Spencer et al. In these devices auxiliary eyewear is fastened to eyeglasses by a conventional clip system with one clipping engaging the temple while other clips engage the conventional frame.

A newer and very popular method of attaching eyeglasses is by using magnets. One such method is disclosed and described in U.S. Pat. No. 4,070,105 of Meeker. In the Meeker patent the conventional frame includes a magnetic material secured around the peripheral portion facilitating attachment of auxiliary eyeglasses to the conventional eyeglass frame.

Another method of attaching auxiliary eyeglasses using magnets is disclosed in U.S. Pat. No. 5,416,537 of Sadler having magnets secured to temporal portions of a conventional frame that mate with similar magnets in auxiliary eyeglass frames. In the Meeker and Sadler patents the magnets are embedded in portions of the frames in a vertical orientation for mating with similar magnets in the auxiliary eyeglasses. A problem with this type of arrangement is that the auxiliary eyeglasses are held in place in front of the conventional eyeglasses only by the strength of the magnets. There are no supporting members to prevent the auxiliary eyeglasses from moving vertically relative to the conventional eyeglass frame. Therefore, when the auxiliary eyeglasses are used in some strenuous activity such as jogging or exercising they can slide off and become detached from the conventional frame.

A design that solves this problem by having magnets in auxiliary eyeglass extensions is disclosed and described in U.S. Pat. No. 5,568,207 of Chao. In this patent the problem of the eyeglasses sliding vertically and coming off the conventional eyeglasses is solved by extensions on the auxiliary eyeglasses having magnets that extend over (i.e. above) hinge connections for the temples of the conventional eyeglasses. Magnets in the hinge connections mate with magnets in the extensions to hold the utility eyeglasses in place in front of the conventional eyeglasses. The extensions fitting over (i.e. above) the hinge portions of the conventional eyeglasses prevent the frames from moving downward. It was thought that this combination of the extension being above the temple connection in combination with the magnet prevents the auxiliary eyeglasses from moving downward relative to the conventional eyeglasses and being dislodged during strenuous activity. That is, the patent describes the prior art as being unable to provide a practical solution to attaching auxiliary eyeglasses to conventional eyeglasses with magnets alone.

The problem with the eyeglasses disclosed and described in U.S. Pat. No. 5,568,207 is that the auxiliary eyeglass extensions must be carefully placed above the temple hinge connections. This makes it little more difficult to attach the auxiliary frames to be sure that the extensions are placed carefully above the hinge connections of the conventional eyeglass. In most cases a wearer has to remove his conventional eyeglasses to attach the auxiliary lenses.

It is, therefore, one object of the present invention to provide an improved method and apparatus for attaching auxiliary eyeglasses to conventional eyeglasses.

Another object of the present invention is to provide an improved method and apparatus for attaching auxiliary eyeglasses to conventional eyeglasses with magnets alone without any need for other support.

Yet another object of the present invention is to provide a method of attaching auxiliary eyeglasses to conventional eyeglasses by appendages having magnets which fit below and mate with similar magnets in the conventional eyeglass extensions for attaching eyeglass temples.

Still another object of the present invention is to provide an improved magnetic attachment of auxiliary eyeglasses to conventional eyeglasses with magnets that are oriented to maximize the magnetic force to prevent vertical or downward movement of the auxiliary eyeglasses.

Still another object of the present invention is to provide an auxiliary eyeglass magnetic connection having magnets that are oriented horizontally to maximize the magnetic force in the vertical direction.

Still another object of the present invention is to provide an auxiliary eyeglass magnetic attachment that includes additional supporting clips, if desired.

Yet another object of the present invention is to provide auxiliary eyeglass magnetic attachment that includes a clip that conveniently fits over the bridge of conventional eyeglass frame.

BRIEF DESCRIPTION OF THE INVENTION

The purpose of the present invention is to provide an improved auxiliary eyeglass attachment method and apparatus that has a secure attachment by use of magnets that effectively prevents the auxiliary eyeglasses from becoming detached from the conventional eyeglass without a need for additional support.

In the preferred embodiment of the invention the auxiliary eyeglasses are attached to conventional eyeglasses by magnets in a manner that prevents any downward or vertical movement that might cause the auxiliary eyeglasses to become detached. The method of attaching with magnets disclosed herein also provides a much easier method of securing the auxiliary glasses to the conventional eyeglasses as will be described in greater detail hereinafter.

It was thought, for example, as disclosed in the patent of Chao, U.S. Pat. No. 5,568,207, that some support was needed to prevent the auxiliary eyeglasses from "moving downward" and coming off the conventional eyeglasses. However, what was not recognized was that magnets have a very strong attraction in a direction perpendicular to their axis. That is, with very strong magnets it is difficult to separate them by pulling them straight apart. Usually to separate them, particularly when they are very strong magnets, is by sliding them in a direction parallel to their mating surfaces. The reason for this is that the magnetic force is stronger in a direction perpendicular to the surface (i.e. the poles) of the magnets than it is to a direction parallel to the surface. The inventor of the auxiliary eyeglasses disclosed herein discovered that because of this principle correctly oriented magnets can securely hold auxiliary eyeglasses on conventional frames without the need for additional support. The key is to orient the magnets so that any vertical force applied to the auxiliary frames will be perpendicular to the plane of the magnets.

To achieve this unique construction of appendages on opposite sides of the auxiliary frames including a socket for receiving magnets that are oriented with the plane of the magnets horizontal and the axis (i.e. poles) vertical or parallel to the auxiliary eyeglass frame. Complementary mating magnets are mounted in sockets on the hinge extensions on the conventional eyeglasses which are also oriented with the plane of the magnets horizontal and their axis (i.e. poles) vertical or approximately parallel to the plane of the conventional eyeglass.

This arrangement means the auxiliary eyeglasses may be easily mounted on the conventional eyeglasses without any fumbling or searching. The user doesn't have to feel with your fingers or remove the eyeglasses to be sure that the auxiliary eyeglass appendages are carefully aligned over the temple mounting extensions as with the arrangement described in U.S. Pat. No. 5,568,207 referred to hereinabove. You simply place the auxiliary eyeglasses against the conventional eyeglasses with a slight upward motion and they easily attach when the magnets come into close proximity. This arrangement makes for a securely attached auxiliary eyeglasses and frame that is simple and easy to use without the difficulties with the other auxiliary eyeglass designs.

One can easily see the auxiliary eyeglasses approaching the conventional eyeglasses with the appendages on the auxiliary eyeglasses below the temple of the conventional eyeglass frame. Then with a very slight upward movement the magnets attract and the auxiliary eyeglass frame is firmly attached. This can be done simply and easily with one hand without any feeling or fumbling that previous arrangements required. The orientation is nearly automatic and doesn't require the more careful alignment that is required of other magnetically fastened auxiliary eyeglasses.

An optional but preferred embodiment of the invention includes modification of the sockets for receiving the magnets that are mounted in the appendages in opposite sides of the utility frames and in complementary sockets on temple extensions on the conventional eyeglasses. In this embodiment the magnets in the sockets on either the auxiliary frames or the temple extensions on the conventional eyeglasses are recessed while the magnets in the opposite sockets are slightly extended or raised. This provides a distinct and improved advantage in mating the magnets on the auxiliary frames with the magnets on the temple extensions of the conventional eyeglasses.

The unique and distinct advantage of the invention is the avoidance of scratching the lenses with the appendages for holding the magnet sockets. The reason, for this is that the auxiliary eyeglasses are mounted from below. With the recessed sockets a more firm attachment is achieved and alignment of the auxiliary eyeglass frames on the conventional eyeglass frames is almost automatic. One need only press the auxiliary eyeglass lenses against the conventional eyeglass lenses and with a slight upward movement, the raised magnets on one side almost automatically slip into and seat in the recess in the complementary socket. The raised and recessed magnets provide automatic alignment and additional support against horizontal movement of the auxiliary eyeglass.

Another optional but preferred embodiment of the invention includes the use of a universal adapter to mount magnets on conventional eyeglass frames utilizing existing hardware and components. This embodiment provides a universal adapter for attaching magnets to conventional eyeglasses. The embodiments described previously have permanently attached magnets requiring specially constructed eyeglass frames. The previous embodiments have sockets with magnets permanently attached to temple extensions for mating with matching magnets on auxiliary eyeglass frames. This embodiment includes a socket with magnets having a tongue with a hole for mounting the socket on conventional eyeglass frames using existing hardware.

In one configuration the socket is attached to a tongue for securing to existing eyeglass frames by a screw passing through the hole of the tongue threaded into the existing threaded hole for mounting the temples on conventional eyeglass frames. The socket holds a magnet constructed to mate with magnets on appendages attached to auxiliary eyeglass frames.

A second configuration includes a socket having a tongue with a hole for mounting the universal adapter socket on the conventional frames by utilizing the threaded hole that secures and clamps a lens in the conventional eyeglass frame. In this embodiment the universal adapter socket has a tongue with a hole for receiving a screw passing through the hole and threaded into the hole in the conventional eyeglass frame that secures and clamps the lens to the frame.

In an optional but less preferred embodiment, clips can provide additional support if desired. This, for example, might be used where very small magnets are used to attach the eyeglasses to the frames. In this embodiment a combination of the clip shown and described in applicant's prior application Ser. No. 08/510,797 filed Aug. 3, 1995 or similar to that shown in the other patents can be attached to the auxiliary eyeglass frame. A clip would be incorporated into the bridge of the auxiliary eyeglass frame which would fit over and engage the conventional eyeglass bridge. This would lock the auxiliary eyeglass frame on the conventional eyeglass frame with the magnets holding the sides in place.

In still another optional but less preferred embodiment, a magnet could be provided beneath the bridge of a conventional eyeglasses to mate with a similar magnet on top of the bridge of the auxiliary eyeglass frame. In this embodiment clips would be attached on top of or in the temple region of the auxiliary eyeglass frame that would fit over and engage the conventional eyeglass frame. In this embodiment the auxiliary eyeglass would be mounted by sliding the clips over the conventional eyeglass frame then pushing down on the bridge so that the magnet on the bridge slides under the bridge of the conventional eyeglass frame mating the magnets. The magnets in the bridge hold the auxiliary eyeglasses onto the frame of the conventional eyeglasses with the clips securely locking it in place.

The above and other novel features of the invention will be more fully understood from the following detailed description and the accompanying drawings, in which:

BRIEF DESCRIPTION OF THE DRAWINGS

FIG. 3 illustrates the connection of the auxiliary eyeglass frame by magnets embedded in an appendage mating with similar magnets embedded in the temple extension of a conventional eyeglass frame.

FIG. 5 shows the embodiment of FIG. 4 mounted on a conventional eyeglass frame.

FIG. 6 is a sectional view taken at 6—6 of FIG. 5.

FIG. 7 is another embodiment in which magnets are embedded in the bridge of the auxiliary eyeglass frame for mating with magnets mounted beneath the bridge of a conventional eyeglass frame and including clips for locking the auxiliary eyeglass frame onto the conventional eyeglass frame.

FIG. 8 illustrates the method of mounting the auxiliary eyeglass frame of FIG. 7 on a conventional eye glasses.

FIG. 9 illustrates the embodiment of FIG. 7 with the auxiliary eyeglass firmly secured on a conventional eyeglass frame.

FIG. 10 is a sectional view taken at 10—10 of FIG. 9.

FIG. 11 is an isometric view of another alternate embodiment of the invention.

FIG. 12 is an isometric view of the preferred alternate embodiment illustrating the method of mounting the auxiliary sunglasses on the conventional eyeglass frame.

FIG. 13 is a sectional view taken at 13—13 of FIG. 11 illustrating the construction and arrangement in the preferred alternative embodiment.

FIG. 15 is an isometric view of another optional embodiment illustrating the mounting of auxiliary eyeglasses on a conventional eyeglass frame.

FIG. 16 is a sectional view taken at 16—16 of FIG. 15.

FIG. 17 is a sectional view similar to FIG. 16 illustrating an alternative construction of a universal adapter socket.

FIG. 18 is an isometric view of an optional configuration of the optional embodiment of the invention.

FIG. 19 is an isometric view of the optional configuration of the optional embodiment illustrating the method of mounting auxiliary eyeglasses on the conventional eyeglass frame.

Frame 20 is a sectional view taken at 20—20 of FIG. 19.

DETAILED DESCRIPTION OF THE INVENTION

Figure 1:
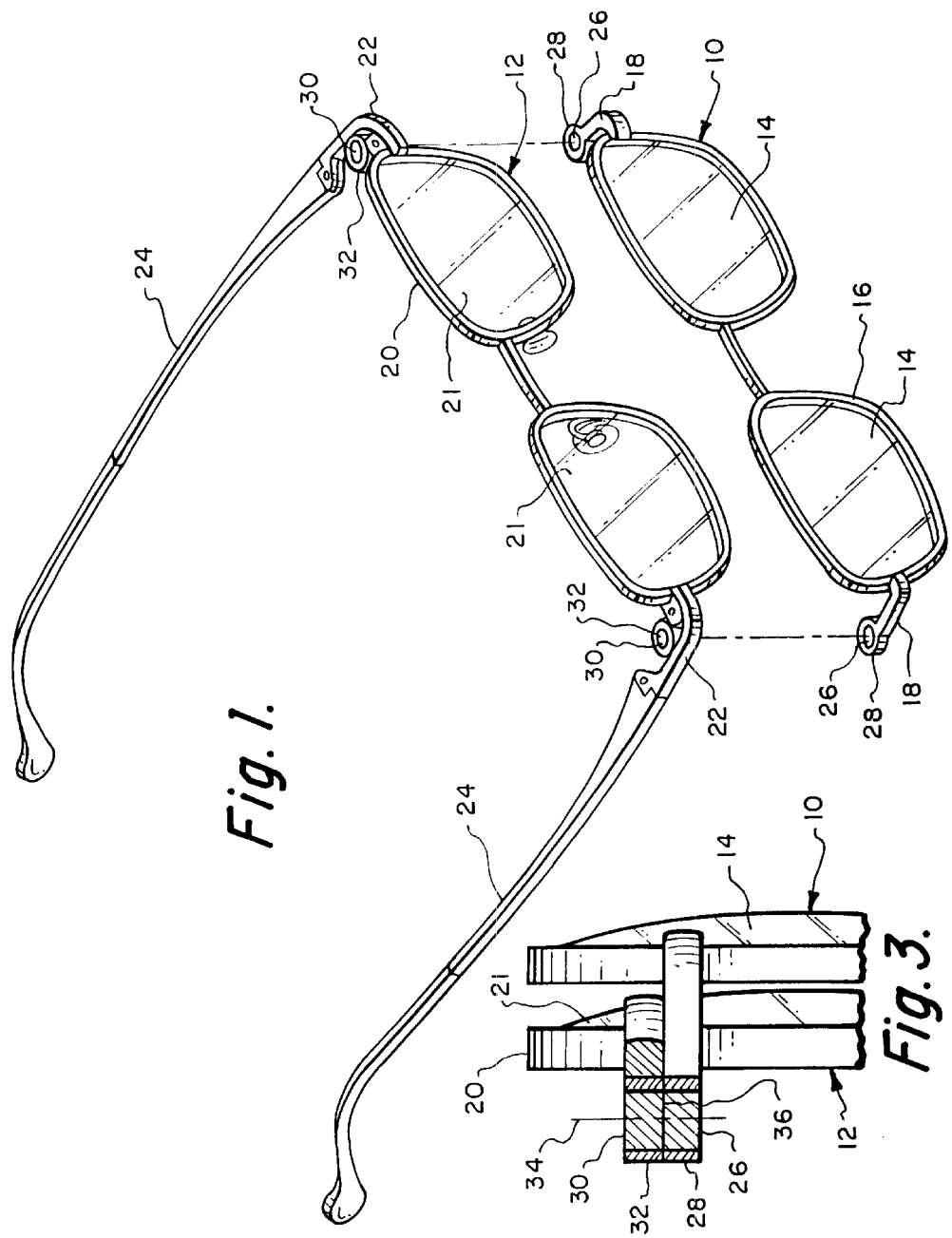
FIG. 1 is an isometric view illustrating the method and apparatus for attaching an auxiliary eyeglass frame to conventional eyeglasses with magnets alone.
Figure 2:
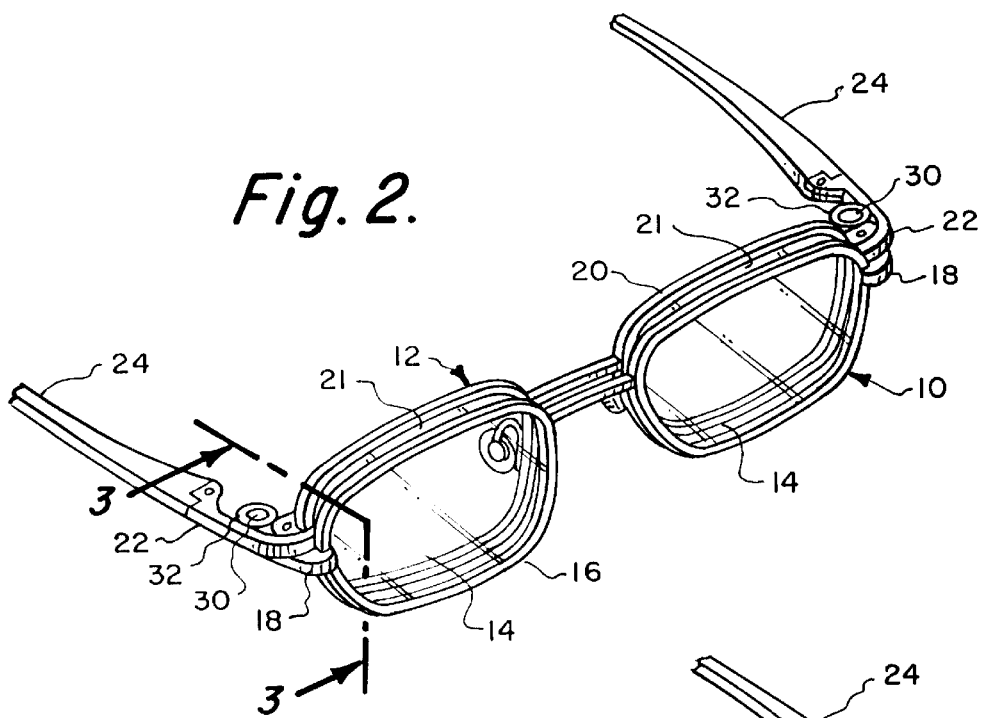
FIG. 2 is an isometric view illustrating the auxiliary eyeglass frame attached to a conventional eyeglass frame with magnets alone.

A unique method and construction for attaching auxiliary eyeglasses 10 to conventional eyeglasses 12 is illustrated in FIGS. 1 through 3. Auxiliary eyeglasses 10 are most commonly tinted eyeglasses to convert conventional eyeglasses 12 to sunglasses but also can have different prescription lenses. Auxiliary eyeglasses 10 has lenses 14 mounted in a frame 16 having appendages 18 extending rearward on either side of frame 16. Conventional eyeglasses 12 have a frame 20 with a bridge 22 with temple extensions 22 on either side of frame 20 for attaching temples 24 to the frames.

In the auxiliary eyeglasses of the prior art magnets are either embedded in frame 20 or in extension on auxiliary eyeglasses that extend over or above the temple extensions 22 of the eyeglass frame 20. With the prior art constructions of magnets embedded in frames 20 the plane of the magnets is vertical or parallel to the lenses facilitating detachment of the auxiliary eyeglasses by a downward shearing force. To solve this problem the auxiliary eyeglasses of U.S. Pat. No. 5,568,207 proposed putting magnets in auxiliary eyeglass extensions that fit over or above the temple mounting extensions on the eyeglass frame. It was thought that some support in addition to the magnets was needed to prevent the auxiliary eyeglasses from becoming detached. While this is a satisfactory solution it is not the best solution. The auxiliary eyeglasses must be carefully positioned above the conventional eyeglass frame to be sure the extensions are above the temples.

The present invention not only provides a solution to the potential detachment or dislodging of auxiliary eyeglass frames 10 but simplifies the method of mounting the auxiliary eyeglass with minimum fuss. This is achieved by inserting magnets 26 in sockets 28 in appendages 18 attached to auxiliary eyeglass frame 16. Complementary magnets 30 are mounted in sockets 32 attached to conventional eyeglass frame 20 temple extensions 22. Preferably magnets 26 and 30 are at least four millimeters (4 mm) in diameter.

An important and critical feature of the invention is the orientation of magnets 26 and 30, which is shown more clearly in sectional view of FIG. 3. Generally magnets have plane surfaces and axis. In this case magnets 26 and 30 are shown as cylindrical having an axis 34 that is vertically oriented and is approximately parallel to auxiliary frame 16 and conventional eyeglass frame 20. This means the maximum magnetic attractive force is vertically oriented along axis 34. Accordingly the maximum magnet force of magnets 26 and 30 is vertically oriented to resist dislodging of auxiliary eyeglass frame 10 by a downward movement. It was found that by mounting magnets 26 and 30 approximately 4 mm in diameter having a strong magnetic force vertically oriented is sufficient to hold auxiliary eyeglass frame 10 in place and prevent downward movement. Thus, auxiliary eyeglass frame 10 is securely mounted on conventional eyeglasses 12 and will not easily dislodged by strenuous activity occurring in sports or exercising.

Shearing forces along interface 36 are minimal and would more likely cause conventional eyeglasses 12 to fall off the wearer before auxiliary eyeglasses 10 would be dislodged. This construction not only improves the attachment of auxiliary eyeglasses 10 but also makes it easy for them to be mounted as illustrated in FIG. 2. Auxiliary eyeglasses 10 can merely be brought up to conventional eyeglasses 12 with a slight upward motion until magnet 26 is attracted to magnet 30 and locks in place. Thus, they can easily be oriented and mounted on conventional eyeglasses 12 without the need to remove conventional eyeglasses from the wearer.

Figure 4:
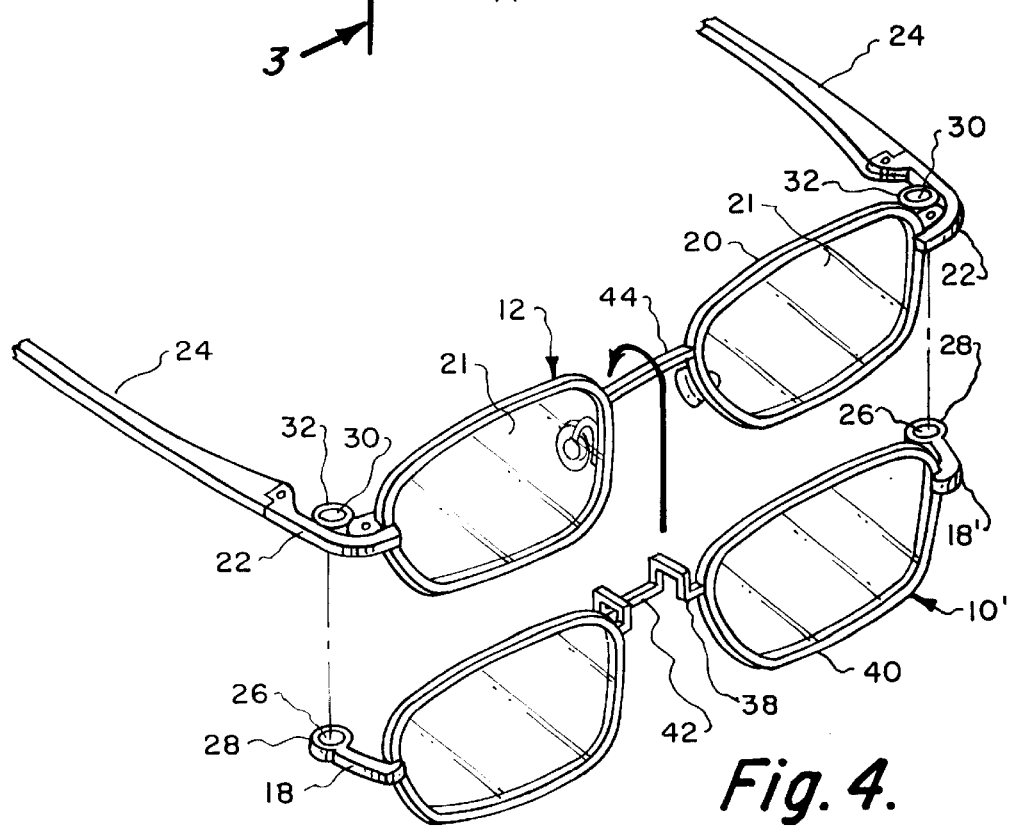
FIG. 4 illustrates an optional embodiment in which a clip formed on the bridge of the auxiliary eyeglass frame fits over and engages the bridge on the conventional eyeglass frame.

An optional but less preferred embodiment is illustrated in FIGS. 4 through 6. In this embodiment auxiliary eyeglasses 10' have appendages 18 with magnets 26 installed in sockets 28 as before. Magnets 26 mate with magnets 30 mounted in sockets 32 on conventional temple extensions 22 on conventional eyeglass frame 20 as before. However, to provide additional security and hold auxiliary frame 10' on conventional eyeglass frame 20, bridge 38 of auxiliary eyeglass frame 40 is formed with a clip 42 constructed to extend over and mount on conventional eyeglass bridge 44. Clip 42 will provide additional support for auxiliary eyeglasses 10' for use in extremely strenuous activity, for example, in cases where sports activities are such that conventional eyeglasses 12 are secured to the head of the wearer with straps that wrap around the back of the head. As shown in FIG. 6 clip 42 formed on auxiliary eyeglass bridge 38 fits securely over bridge 44 on conventional eyeglass frame 20.

To mount the auxiliary eyeglasses 10' of FIG. 4, they are placed against the conventional eyeglasses 12 and slid gently upward until magnet 26 mates with magnet 30. Clip 42 formed in bridge 38 of auxiliary frame 40 is then slipped over a conventional eyeglass bridge 44 securely mounting eyeglasses 10' on conventional eyeglasses 12.

Another embodiment utilizing the combination of magnets and clips to securely mount auxiliary eyeglasses on conventional eyeglasses is illustrated in FIG. 7 through 10. In this embodiment auxiliary eyeglasses 50 are formed with clips 52 mounted on the eyeglass frame 54 on the upper quadrant of the frame. Magnets 56 are secured in bridge 58 joining auxiliary eyeglass lenses 60. Conventional eyeglasses 62 are formed with frame 64 having a bridge 66 having complementary magnets 68 mounted in the bridge. In this embodiment auxiliary eyeglasses 50 are mounted on conventional eyeglasses 62 by the combination and opposing forces of clips 52 fitting over frame 70 of conventional eyeglasses 62 and bridge 58 fitting beneath bridge 66 so that magnets 56 in bridge 66 mate.

The installation of auxiliary eyeglasses 50 on conventional eyeglasses 62 is illustrated in FIGS. 8 and 9. Clips 52 on the upper quadrant of auxiliary lens frame 54 fit over conventional eyeglass frame 70 as shown in FIG. 8. Auxiliary eyeglass bridge 58 is sufficiently flexible that bridge 58 can be pushed beneath bridge 66 on conventional eyeglass frame 62 allowing magnets 56 to mate with magnets 68 embedded in conventional eyeglass bridge 66. Thus, auxiliary eyeglasses 50 are securely mounted on conventional eyeglasses 62 as illustrated in FIG. 9 and held in place by the opposing forces of clips 52 and magnets 56 and 68. Again, this construction would perhaps be best where extremely strenuous activity is involved that requires conventional eyeglasses 62 to be secured on the head of the wearer with a strap.

Another alternate but preferred embodiment is illustrated in FIGS. 11 through 13. This embodiment improves the mounting of auxiliary eyeglasses 10' on conventional eyeglass frames 12' and also improves the aesthetic appearance. This embodiment improves the appearance of the magnets in the conventional eyeglass frame 12' by covering the exposed surface with a protective and decorative coating of material 72 configured to match the color and appearance of the conventional eyeglass frames 12'. Thus when auxiliary eyeglass frames 10' are removed from conventional eyeglass frames 12', the magnets in the sockets are not clearly visible. This is not possible with the arrangement in which the magnets mate above the conventional eyeglass frame 12'. When the auxiliary eyeglass frames 10' are removed the magnets would be visible.

A unique and important improvement is illustrated in FIGS. 12 and 13. In this embodiment a significant improvement has been achieved to assure secure attachment and alignment of auxiliary eyeglass frames 10' with conventional eyeglass frames 12'. To assure proper alignment and secure attachment, magnets 26 in sockets 28 are extended or raised while magnets 30 in socket 32 are offset in recess 74. Thus when auxiliary frames 10' are pressed against conventional frames 12 with a gentle upward movement, alignment is insured by raised magnets 26 slipping into and seating in recess 74 in conventional eyeglass sockets 32 as shown in FIG. 13. Magnet 26 in socket 28 are also covered with a protective and decorative coating material 72 to improve the aesthetic appearance and conceal the magnets.

Of course, either of sockets 28 or 30 could contain the recessed sockets while the other complementary socket could have the extended or raised magnet. The raised magnets 26 on the auxiliary eyeglass are merely shown to illustrate the construction and arrangement that improves alignment and provides a more secure attachment of auxiliary eyeglass frames 10' on primary or conventional eyeglass frames 12'. The lip or surface of recess 74 in socket 32 provides additional support for the auxiliary eyeglass frames to prevent the auxiliary eyeglass frames from moving in a horizontal direction. The construction and arrangement provides not only a secure and very efficient method of attaching auxiliary eyeglass frames 10' to main or conventional eyeglass frames 12' but provides automatic alignment and makes attachment much easier.

However, for most sports activities and exercising the construction disclosed and described with respect to FIGS. 1 through 3 is sufficient to mount auxiliary eyeglasses 10 on conventional frames 12. The key feature here is the orientation of magnets 26 and 30 so that the maximum magnetic attractive force along their axis (i.e. poles) 34 is vertically oriented or parallel with conventional eyeglass frame 20. In an optional but preferred embodiment the magnets form a recess in the sockets on either the auxiliary eyeglass frames or the conventional eyeglass frames while the magnets are slightly raised in the complementary sockets. This improves and assists in aligning the auxiliary eyeglass frames on the conventional eyeglass frames and also provides more secure attachment by hindering horizontal movement. In most cases only a substantial shearing force parallel to the interface 36 between magnets 26 and 30 could dislodge auxiliary eyeglasses 10 but then that force would probably dislodge conventional eyeglasses 12 from the head of the wearer.

All the embodiments previously described require specially constructed eyeglass frames to accommodate the auxiliary eyeglasses containing the magnets. That is, the conventional eyeglass frames have permanently mounted magnets as an integral part of temple extensions secured to conventional eyeglass frames. It would be advantageous if the system disclosed and described could be applied to existing conventional eyeglass frames. For that purpose, the embodiment illustrated in FIGS. 14 through 20 has been conceived.

This embodiment is similar to the embodiment illustrated in FIGS. 11 through 13 because it employs the recessed socket to assist in alignment and retention of the auxiliary eyeglasses on the conventional eyeglass frame. Where this embodiment differs is the use of existing conventional eyeglass frame hardware for mounting the magnet. Thus the magnets can be attached to any existing conventional eyeglass frame.

Figure 14:
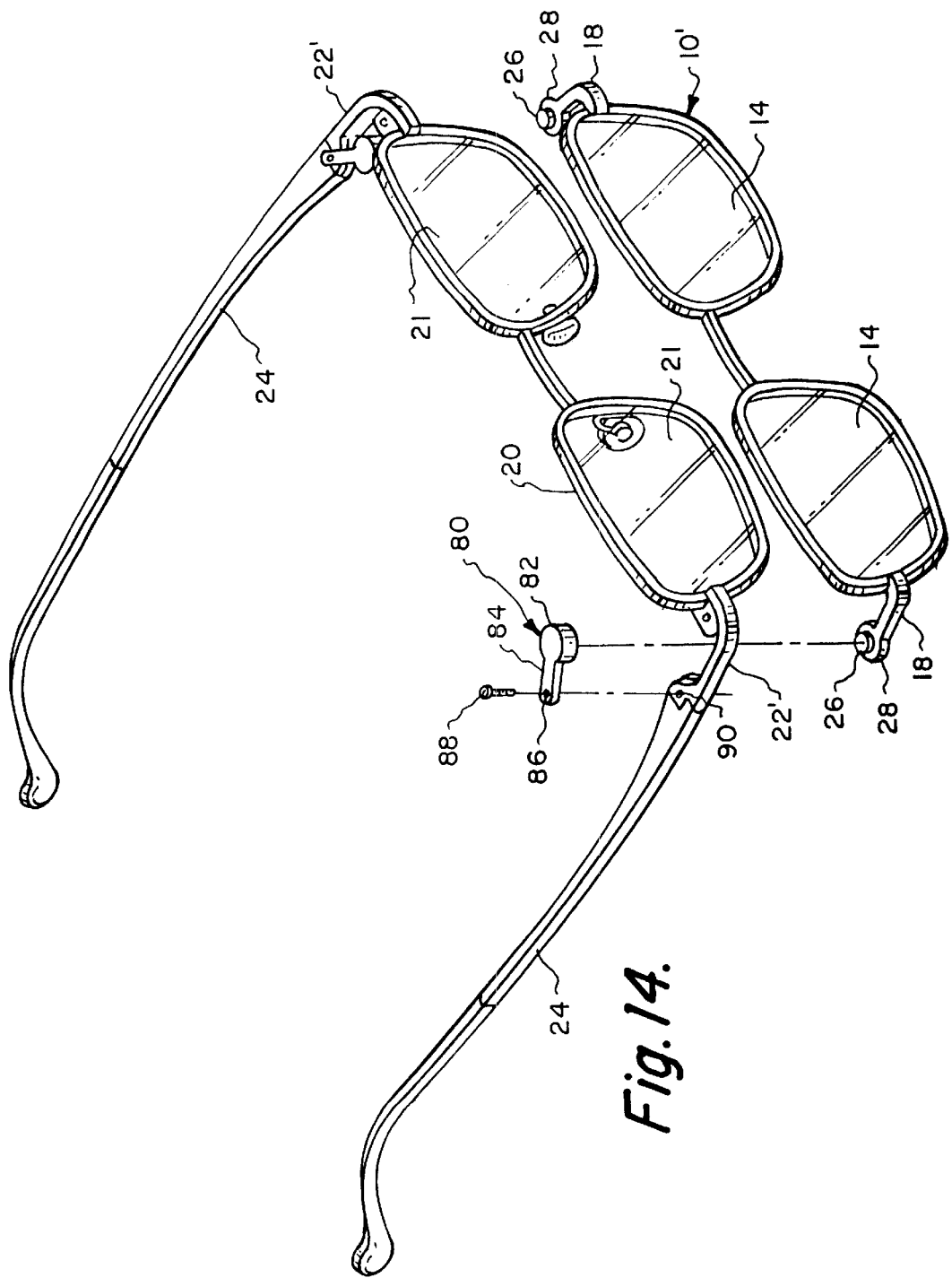
FIG. 14 is an isometric view of another optional embodiment of the invention with like reference numbers indicating like parts throughout.

As illustrated in FIG. 14 conventional eyeglass frame 12 has a extension 22' for attachment of temples 24. Temple extensions 22' and temples 24 are attached to conventional eyeglass frame 12 with screws 88. This optional embodiment takes advantage of that mounting hardware.

This optional embodiment provides a universal adapter 80 comprised of a socket 82 having a tongue 84 with a screw hole 86 for receiving a screw 88. Universal adapter 80 is mounted on conventional eyeglass temple extension 22' by threading mounting screw 88 into hole 90. Universal adapter 80 thus allows a magnet to be attached to any conventional eyeglass frame as illustrated in FIGS. 15 through 17.

The construction and mounting of universal adapter 80 is illustrated more clearly shown in sectional views of FIGS. 16 and 17. Universal adapter 80 is comprised of a socket 82 for receiving magnet 92. Preferably socket 82 has a recess 94 for receiving raised magnet 26' in socket 28 attached to temple extension 18 on auxiliary eyeglass frames and 10'. Thus the universal adapter 80 disclosed allows auxiliary eyeglasses 10' to be attached to any existing conventional eyeglass frame by simply attaching the universal adapter to the eyeglass frames with a screw 90 that also holds or secures conventional eyeglass temples 24.

An optional construction of universal adapter 80 is illustrated in FIG. 17. This universal adapter 80' functions exactly the same except that it is comprised of a bar 96 forming tongue 84 secured to cylinder 98 by welding 100. A magnet 102 is seated in cylinder 98 providing a recess 104 for receiving magnets 26 mounted in socket 28 on temple extension 18 of auxiliary eyeglass frame 10'. Universal adapter 80' attaches to conventional eyeglass frame as before with screw 88 threaded into hole 90 for securing temples 24 to eyeglass frame 20.

Auxiliary eyeglass frame 10' is mounted as described previously and shown in FIG. 15. Auxiliary eyeglass frame 10' is mounted from the bottom by a upward movement to seat magnets 26' in sockets 82 or 90 in universal adapter 80 or 80'. Recesses 94 or 104 securely hold auxiliary eyeglass frame 10' on conventional eyeglass frame 12.

Another optional configuration of the universal adapter 80 is illustrated in FIGS. 18 through 20. This configuration utilizes the existing hardware for mounting or clamping a lens 21 in frame 12. Lens 21 is mounted on conventional eyeglass frame 12 by clamping with screw 106 through flanges 108. In this embodiment since screw 106 threads into flanges 108 on conventional eyeglass 12 from the bottom, a modified or different universal adapter is required.

Modified universal adapter 110 is shown in greater detail in sectional view of FIG. 20 taken at 20—20 of FIG. 19. Universal adapter 110 is comprised of a cylinder 112 having a socket 114 for receiving a magnet 116.

To permit universal adapter 110 to be attached to the bottom of conventional eyeglass clamping flanges 108 by screw 106, tab 118 extends from the bottom periphery of cylinder 112 and has a hole 120 for receiving mounting screw 106. Note in this embodiment that magnet 26' in socket 122 provides a recess 124. Magnet 116 extends above the surface of cylinder 110 and seats in recess 124 of socket 122. This securely holds auxiliary eyeglasses 10' on conventional eyeglasses 12. Thus universal adapter 110 can be mounted below flange 108 with screw 106 that is used to clamp and hold lens 21 in conventional frame 12. The sectional view of FIG. 20 illustrates that the magnet on the auxiliary eyeglass 10' can be recessed rather than the magnet on the conventional eyeglass frames or vice-a-versa as shown previously.

The mounting of auxiliary eyeglasses 10' on conventional eyeglass frames 12 is illustrated in FIGS. 18 and 19. Universal adapter 110 with integrally formed tab 118 is attached to conventional eyeglass frame 12 by threading screw 106 through hole 120 into flange 108 as illustrated in sectional view of FIG. 20. For the universal adapter 110 mounted on each side of conventional eyeglass frame 12, auxiliary eyeglass 110 can then be fitted from beneath by sliding auxiliary eyeglass frame up on conventional on eyeglass frame 12. until magnet 116 extending from cylinder 112 mates with magnet 26' on auxiliary eyeglass appendages 18.

Thus there has been disclosed novel and unique methods for attaching auxiliary eyeglass to conventional eyeglasses. In one embodiment, magnets having an orientation such that their maximum magnetic force is vertical or parallel with conventional eyeglass frame is sufficient to hold the auxiliary eyeglasses securely on the conventional eyeglasses.

Auxiliary eyeglasses 10' have appendages with cylindrical sockets for receiving magnets. Magnets are mounted on temple extension of conventional eyeglasses for receiving the auxiliary eyeglass frame appendages 18 that pass beneath the temple extensions of the conventional eyeglass. In another preferred variation, the magnets in one socket is recessed while in the other socket the magnet is extended to assist in alignment in holding the auxiliary eyeglass frame on the conventional eyeglass frame.

In still another embodiment of the invention, magnets are mounted in a universal adapter cylindrical sockets that can be mounted on conventional eyeglass frames utilizing existing hardware. In this embodiment, a magnet is mounted in a cylinder having a socket for receiving the magnet and a tongue having a hole for receiving a temple mounting screw. The cylindrical socket for receiving the magnet faces downward and is recessed for receiving an extended magnet mounted on an appendages of auxiliary eyeglasses to seat in the recess in the universal adapter.

Another variation employs a universal adapter that attaches by using the screw for closing and clamping the conventional eyeglass frame around a lens. In this embodiment, a cylindrical socket is formed for receiving a magnet facing downward and is mounted beneath the flange for the lens clamping screw and has a tongue for securing the auxiliary universal adapter to the lens clamping flange.

In another less preferred embodiment a clip is attached to or integrally formed on the bridge of the auxiliary eyeglass frame for fitting over and securing the auxiliary eyeglasses to the bridge of the conventional eyeglasses.

In yet a third but less preferred embodiment a combination of clips and magnets are employed to mount auxiliary eyeglasses on conventional eyeglasses. In this third embodiment clips are formed in an upper quadrant on the frame of the auxiliary eyeglasses that fit over the frame of the conventional eyeglasses. Magnets embedded in the bridge of the conventional eyeglasses mate with magnets embedded in the bridge of the auxiliary eyeglasses such as the auxiliary eyeglass bridge fits beneath the conventional eyeglass bridge.

This invention is not to be limited by the embodiment shown in the drawings and described in the description which is given by way of example and not of limitation, but only in accordance with the scope of the appended claims.

What is claimed is:

1. Apparatus for attaching auxiliary eyeglasses to conventional eyeglasses comprising;
   a plurality of magnets mounted on said conventional eyeglasses;
   each of said plurality of magnets being mounted in a universal adapter constructed to be mounted on said conventional eyeglasses with existing hardware, said universal adapter comprising;

a socket for mounting a magnet;

a tongue extending from said socket;

said tongue having a mounting hole for receiving a mounting screw for attaching said universal adapter to frames of said conventional eyeglasses;

a plurality of magnets mounted on said auxiliary eyeglasses for mating with said plurality of magnets on said conventional eyeglasses;

said plurality of magnets on said conventional eyeglasses and said mounting plurality of magnets on said auxiliary eyeglasses being oriented such that the maximum magnetic attractive force between said magnets is oriented vertically parallel to lenses in said conventional eyeglasses;

whereby said plurality of magnets on said auxiliary glasses mate with said plurality of magnets attached to said conventional eyeglasses by said universal adapter.

2. The apparatus according to claim 1 in which said tongue is integrally formed on said socket for receiving said magnet.

3. The apparatus according to claim 2 in which said tongue is integrally formed on said socker for mounting with said screw to an existing mounting hole for attaching temples to said conventional eyeglasses.

4. The apparatus according to claim 2 in which said tongue is integrally formed on said socket for mounting with said screw to existing holes in a flange for clamping a lens in said conventional eyeglass frame.

5. The apparatus according to claim 2 in which said tongue is welded to said socket for receiving said magnet.

6. The apparatus according to claim 5 in which said tab is welded on said socket for mounting with said screw to an existing mounting hole for attaching temples to said conventional eyeglass frame.

7. The apparatus according to claim 2 in which each of said plurality magnets in said socket form a recess; each of said plurality magnets on said auxiliary eyeglasses are extended; whereby said extended magnets fit into said recess and mate with a respective magnet in said universal adapter.

8. The apparatus according to claim 2 in which each of said magnets in said socket extend beyond an end of said socket; each of said plurality of magnets on said auxiliary eyeglasses are mounted to form a recess; whereby said extended magnets fit into said recess and mate with a respective magnet on said auxiliary eyeglasses.

* * * * *